2,906,708

PREVENTION OF CORROSION

Joseph A. Caldwell and Melba L. Lytle, Houston, Tex., assignors, by mesne assignments, to Jersey Production Research Company, Tulsa, Okla., a corporation of Delaware No Drawing. Application June 20, 1956
Serial No. 592,496

4 Claims. (Cl. 252—8.55)

The present invention is directed to a method for inhibiting the growth of sulfate-reducing bacteria. More particularly, the invention is concerned with preventing the corrosion of ferrous metal exposed to sulfate-reducing bacteria. In its more specific aspects, the invention is concerned with preventing corrosion of ferrous metal pipe in a well exposed to sulfate-reducing bacteria.

The present invention may be briefly described as a method for inhibiting the growth of sulfate-reducing bacteria in which the bacteria are exposed to or contacted with a silicon-containing medium. Particularly, ferrous metal surfaces exposed to sulfate-reducing bacteria in a nutrient medium for the bacteria may be protected against corrosion caused by said bacteria by contacting the bacteria where the pipe is exposed to them with a silicon-containing medium.

The sulfate-reducing bacteria are known as Desulfovibrio and are sometimes identified as *Sporovibrio desulfuricans* and may be found in both salt water and fresh water. These bacteria are sulfate reducers and release corrosive materials, such as hydrogen sulfide and the like, which, in the aqueous medium, form corrosive solutions which attack ferrous metal equipment. In accordance with the present invention, the corrosiveness caused by the bacteria is prevented by contacting the bacteria in its nutrient medium with a silicon-containing material. The silicon-containing medium may be any one of a large number of silicon-containing materials, such as ground silica and organic silico halides. For example, the organic silico compound may be illustrated by dibutylamine silicofluoride, aniline silicofluoride, methylamine silicofluoride and the like. Where solid comminuted silica is employed it may have a particle size in the range from about 150 to about 300 mesh. Ground silica obtained by grinding quartz, tridymite, amorphous opal, impure sand, and the like, may be used.

In practicing the present invention, for example, in a well drilled in the earth's surface, it is customary to line a borehole with a casing constructed of ferrous metal. Back of the casing in contact with the formation or in the borehole, the casing is frequently attacked by corrosive materials released by sulfate-reducing bacteria. In accordance with the present invention, this corrosiveness is prevented by inhibiting the growth of the bacteria. This may be accomplished by pumping an aqueous or oily suspension containing a silicon-containing material down into the well and into the area where the sulfate-reducing bacteria are in contact with the pipe. For example, it may be possible to introduce a suspension of the silicon-containing material into a well tubing in a well casing and then force the suspension up around the casing into the annulus between the well bore and the casing.

The silicon-containing material may also be introduced into the annular space between the bore-hole and the casing by introducing a silicon-containing material in the suspension down the annulus from the earth's surface.

Likewise, the silicon-containing material, either as a solid, liquid, or as a suspension, may be introduced into the well in a dump bailer having an openable bottom and releasing the silicon-containing material as the dump bailer is lowered on a wire line at the point where it is to be located.

There are many ways of introducing the silicon-containing material into contact with the sulfate-reducing bacteria, such as by pumping, flowing or by lowering same in a container.

The amount of organic silicofluoride to be employed may be of sufficient amount to inhibit the growth of the sulfate-reducing bacteria and may range from 0.01 to 0.5 weight percent of the nutrient solution, the exact amount depending on the nutrient material and the concentration of sulfate-reducing bacteria therein. Ordinarily, an amount in the range given based on the amount of nutrient material may be employed satisfactorily.

The invention will be further illustrated by the following examples:

A nutrient medium had sulfate-reducing bacteria added thereto. The composition of the nutrient solution was as follows:

| | |
|---|---|
| Tap water _____ml__ | 1000 |
| $NH_4Cl$ _____g__ | 1.00 |
| $MgSO_4.7H_2O$ _____g__ | 2.00 |
| $Na_2SO_4$ _____g__ | 0.44 |
| $K_2HPO_4$ _____g__ | 0.50 |
| $CaCl_2.2H_2O$ _____g__ | 0.10 |
| Mohr's salt _____ | Trace |
| Na-lactate _____g__ | 3.5 |

Steel coupons were then exposed in jars of said medium to which ground silica having a mesh in the range from 180 to 200 was added in an amount equal to 1½ times the weight of the nutrient solution. After 150 days' exposure of the steel coupons to the nutrient solution, it was found that the lower part of the coupons had not blackened and the silica saturated with nutrient solution contained only a few colonies of the bacteria with no evidence of spreading or growth thereof. Visual observation indicated that the ground silica had surrounded the coupons and effectively protected same against the bacteria.

In another operation, cultures of sulfate-reducing bacteria had metal coupons placed therein and exposed to the sulfate-reducing bacteria. Dibutylamine silicofluoride in an amount of 0.1% by weight based on the nutrient solution was added to the cultures of sulfate-reducing bacteria. After standing for 63 days, it was observed that the metal surface of the coupons exposed to the bacteria had not been blackened.

The present invention is quite advantageous and useful in that the silicon-containing material may be easily employed in preventing corrosion in well casing and in well pipe and the like. Furthermore, silica per se is relatively inexpensive and the present invention's advantages may be realized by employing silicon-containing material in divided form as has been illustrated.

The nature and objects of the present invention having been completely described and illustrated, what we wish to claim as new and useful and to secure by Letters Patent is:

1. A method for preventing corrosion of ferrous metal exposed to sulfate reducing bacteria in an aqueous nutrient medium which comprises introducing finely divided silica having a mesh size in the range from about 150 to about 300 into contact with said metal at least where said metal is exposed to said bacteria.

2. A method in accordance with claim 1 in which the silica is in an oily suspension.

3. A method in accordance with claim 1 in which the silica is in an aqueous suspension.

4. A method for preventing corrosion of ferrous metal exposed to sulfate-reducing bacteria in an aqueous nutrient medium which comprises introducing a suspension of finely divided silica having a mesh size in the range from about 150 to about 300 into contact with said metal at least where said metal is exposed to said bacteria.

References Cited in the file of this patent

UNITED STATES PATENTS

| | | |
|---|---|---|
| 1,617,708 | Gehauf et al. | Feb. 15, 1927 |
| 2,477,892 | Paquette | Aug. 2, 1949 |
| 2,560,331 | Buchan | July 10, 1951 |
| 2,582,568 | Speier | Jan. 15, 1952 |
| 2,640,756 | Wills | June 2, 1953 |
| 2,728,785 | Albisette et al. | Dec. 27, 1955 |
| 2,733,206 | Prusick et al. | Jan. 31, 1956 |

OTHER REFERENCES

La Susa: Corrosion in Water Flood and Disposal Systems, article in World Oil, April 1955, pp. 242, 244 and 245.